(12) United States Patent  
Hug et al.

(10) Patent No.: US 8,109,135 B2
(45) Date of Patent: Feb. 7, 2012

(54) CANTILEVER ASSEMBLY (75) Inventors: Hans J. Hug, Kirchdorf (CH); Bart Hoogenboom, Basel (CH); Sascha Martin, Basel (CH); Jinling Yang, Beijing (CN)

(73) Assignee: Nano World AG, Basel (CH)

( * ) Notice: Subject to any disclaimer, the term of this patent is extended or adjusted under 35 U.S.C. 154(b) by 628 days.

(21) Appl. No.: 10/595,690

(22) PCT Filed: Nov. 4, 2004

(86) PCT No.: PCT/IB2004/003599
§ 371 (c)(1),
(2), (4) Date: Feb. 15, 2007

(87) PCT Pub. No.: WO2005/043551
PCT Pub. Date: May 12, 2005

(65) Prior Publication Data
US 2007/0271996 A1 Nov. 29, 2007

(30) Foreign Application Priority Data

Nov. 4, 2003 (EP) .................................... 03025187

(51) Int. Cl.
*G01B 5/28* (2006.01)
*G01B 21/30* (2006.01)
*G01Q 20/02* (2010.01)
*G01Q 40/02* (2010.01)
*G01Q 70/02* (2010.01)
*G01Q 90/00* (2010.01)

(52) U.S. Cl. ................. 73/105; 73/1.89; 850/6; 850/19; 850/33; 850/53; 850/63; 29/592

(58) Field of Classification Search .................. 105/105; 250/306, 307; 850/5, 6, 33, 53, 63, 19, 20; 73/1.89
See application file for complete search history.

(56) References Cited

U.S. PATENT DOCUMENTS
5,245,863 A 9/1993 Takao et al.
5,319,961 A * 6/1994 Matsuyama et al. ............ 73/105
(Continued)

FOREIGN PATENT DOCUMENTS
JP 5-66127 3/1993
(Continued)

OTHER PUBLICATIONS

Viani, et al., "Small Cantilevers for Force Spectroscopy of Single Molecules," Journal of Applied Physics, American Institute of Physics, New York, US, vol. 86, No. 4, Aug. 15, 1999.

(Continued)

*Primary Examiner* — Daniel Larkin
(74) *Attorney, Agent, or Firm* — Joyce von Natzmer; Pequignot + Myers LLC (57) ABSTRACT

A cantilever assembly (1) comprises a cantilever (10) having a cantilever tip (11). The cantilever is mounted to a rigid support (12,120,121) and is provided on its back side with an area (110) of a high reflectance material having a boundary (111) sloping towards the support (12). The extensions (c, $\Delta c$) of the area (110) and of the boundary (111) towards the support fulfil the condition $c/\Delta c \geq 1$ wherein c denotes the extension of the area (110) of the high reflectance material in the direction towards the support (12), and $\Delta c$ denotes the extension of the sloped boundary (111) of the area (110) of the high reflectance material in the direction towards the support (12).

19 Claims, 5 Drawing Sheets

U.S. PATENT DOCUMENTS

| | | | |
|---|---|---|---|
| 5,717,132 | A | 2/1998 | Watanabe et al. |
| 5,753,912 | A | 5/1998 | Matsuyama |
| 5,811,017 | A * | 9/1998 | Matsuyama ............... 216/11 |
| 5,982,009 | A | 11/1999 | Hong et al. |
| 6,365,895 | B1 * | 4/2002 | Yamamoto ............... 850/52 |
| 6,435,015 | B1 | 8/2002 | Yamamoto |

FOREIGN PATENT DOCUMENTS

| | | |
|---|---|---|
| JP | 8-297129 | 11/1996 |
| JP | 09105755 A | 4/1997 |
| JP | 09-159680 | 6/1997 |
| JP | 9-196933 | 7/1997 |
| JP | 9-304410 | 11/1997 |
| JP | 11-101810 | 4/1999 |
| JP | 2001-188035 | 7/2001 |
| JP | 2002-116132 | 4/2002 |
| JP | 2003-42931 | 2/2003 |
| WO | WO 02/080186 | 10/2002 |

OTHER PUBLICATIONS

Walters, et al., "Atomic Force Microscopy Using Small Cantilevers," Proceedings of the SPIE, SPIE, Bellingham, VA, US, vol. 3009, pp. 43-47, 1997.

Kikukawa, et al., "In-Line Optical Lever System for Ultrasmall Cantilever Displacement Detection," Japanese Journal of Applied Physics, Publication Office Japanese Journal of Applied Physics, Tokyo, Japan, vol. 39, No. 4A, Part 1, pp. 1885-1889, Apr. 1, 2000.

English Translation of the Office Action issued by the Japanese Patent Office dated Oct. 13, 2009 for Japanese Patent application No. 2006-537478.

Decision of Refusal issued by the Japanese Patent Office on May 9, 2011 in Japanese Patent Application No. 2006-537478 (English Translation & Original).

Rangelow et al., "Thermal nano-probe," Microelectronic Engineering, vol. 57-58, 2001, pp. 737-748.

* cited by examiner

CANTILEVER ASSEMBLY

This is the U.S. national stage of International application PCT/IB2004/003599, filed Nov. 4, 2004 designating the United States and claiming priority to European Application EP03025187.0, filed Nov. 4, 2003.

FIELD OF THE INVENTION

The present invention deals with a cantilever assembly.

BACKGROUND OF THE INVENTION

In atomic force microscopy (AFM) or scanning force microscopy (SFM), locally distributed small forces are to be measured in order to obtain an image of a sample. This is done with the aid of a cantilever, which is moved across the sample. That end of the cantilever that is remote from the tip is attached to a rigid support, which has a large mass compared to that of the cantilever. Upon movement of the cantilever across the sample, the forces acting on the cantilever tip result in deflection of the cantilever. The deflection is detected and processed, and together with an information about the respective position of the tip relative to the sample an image of the sample can be obtained.

Because of the thermal noise of the cantilever, a high resonance frequency and a low stiffness of the cantilever are desirable. Thus, the thermal noise is reduced and the sensitivity is enhanced. High sensitivities of the cantilevers are required for obtaining a high quality image. A high resonance frequency of the cantilever is furthermore advantageous with respect to dynamic measurements in which high scanning speeds are desired. Since the resonance frequency of the cantilever increases with an increasing stiffness and a decreasing mass of the cantilever and at the same time a large ratio of resonance frequency to stiffness is desired to increase cantilever sensitivity, cantilevers having little mass are preferred. This calls for small cantilevers having little length, width and thickness.

In addition, a high quality factor of the respective cantilever increases its sensitivity. The quality factor is representative of the attenuation of a given excitation: the higher the quality factor, the longer the duration of the oscillation caused by a given excitation (i.e. the lower the attenuation).

Small cantilevers have been suggested which have been made from silicon-nitride. However, the quality factor of cantilevers made from silicon-nitride is intrinsically low and accordingly, their sensitivity is limited. Cantilevers made from pure silicon offer enhanced sensitivity due to a higher quality factor of pure silicon.

As already outlined, the deflection of the cantilever tip as well as the exact position of the tip relative to the sample must be exactly known at any time in order to obtain a high quality image of the sample. For that reason, typically optical tracking of the position of the cantilever tip is performed. This is usually done with the aid of a deflection sensor which receives light that has been reflected from the back side of the cantilever tip. In order to get more light reflected, the back side is typically coated with a high reflectance metal film compared to pure silicon, e.g. a gold film. However, coating the small cantilever with a gold film over a large area and in particular up to the support chip results in considerable decrease of the quality factor and thus results in considerably lower sensitivity.

Gold coatings may be applied through a mask which allows gold evaporated from a source only to impinge on the back side of the cantilever through a well-defined opening in the mask. The macroscopic dimensions of the support chip necessary for high rigidity and for practical use make it practically impossible to deposit the gold in an area having well-defined sharp boundaries, since the mask cannot be positioned in sufficiently close proximity to the back side of the cantilever tip. Rather, boundaries having considerable extensions are resulting from application of conventional masking techniques. Also, the smaller the dimensions of the cantilevers are, the more the alignment of a separate mask becomes difficult, and with regard to very small cantilevers in the micron-size, deposition of a gold film through a separate mask is not feasible.

SUMMARY OF THE INVENTION

The present invention now suggests a cantilever assembly as described herein. Also, the present invention suggests a process for the manufacture of such a cantilever assembly.

In particular, the cantilever assembly according to the invention comprises a cantilever having a cantilever tip. The cantilever is mounted to a rigid support and is provided on its back side facing away from the sample with an area of a high reflectance material. This area has a boundary sloping towards the support. The extensions of the area and of the boundary towards the support fulfil the condition $$c/\Delta c \geqq 1,$$

wherein $c$ denotes the extension of the area of the high reflectance material in the direction towards the support, and $\Delta c$ denotes the extension of the sloped boundary (111) of the area (110) of the high reflectance material in the direction towards the support (12).

In other words, the "penumbra" (the slope) at the area covered with the high reflectance material (e.g. gold) has an extension towards the support that is equal to or smaller than the extension of the area itself. More preferably, the ratio of $c/\Delta c$ is equal to or greater than two, defining an even sharper slope. The cantilever of such a cantilever assembly may thus have a high quality factor even when the cantilever is small. With regard to a high quality factor, the area on the back side of the cantilever tip should not have a large extension and should also have a sharp boundary, since covering a large portion of the back side of the cantilever results in a significant decrease of the quality factor of the cantilever and thus results in considerably decreased sensitivity.

As already mentioned, this may be particularly advantageous—but not limited to—small cantilevers. Small cantilevers may be cantilevers, wherein the length of the cantilever is in the range of 1 µm to 100 µm, in particular in the range of 3 µm to 20 µm, and wherein the extension $c$ of the area covered by the high reflectance material is in the range of 0.5 µm to 10 µm, in particular in the range of 1 µm to 6 µm.

In an embodiment of the cantilever assembly according to the instant invention, the support is provided with a sharp edge that is located at a distance from the back side of the cantilever tip. This distance is determined such that during application of the high reflectance material the area on the back side of the cantilever tip and the sloping boundary are formed. The location of the sharp edge is thus used to determine the extension of the area of the high reflectance material on the back side of the cantilever as well as the extension of the sloping boundary. It is thus possible on one hand to arrange the "mask" (the edge) in close proximity to the area to which the high reflectance material (e.g. gold) is to be applied. On the other hand, no separate mask is needed, since the mask is formed by a part of the support thus eliminating the problems encountered with the alignment of a separate mask. Using dry-etching techniques it is possible to produce such sharp edges with the required accuracy at the determined location.

In an advantageous embodiment of the cantilever assembly according to the instant invention, the support further comprises a guidance and calibration structure for guiding and calibrating an optical tracking system in focusing on the area covered by the high reflectance material.

When AFM is started, first of all the optical tracking system must "find" the cantilever tip. Also, it must be known which amount of movement of the optical system corresponds to which distance. In order to facilitate this, the afore-mentioned embodiment is advantageous, since in case no guidance and calibration structure were present, the three-dimensional space must otherwise be searched in fine steps in order to find the cantilever tip. However, searching the cantilever tip in this manner takes considerable time. The guiding and calibrations structure simplifies finding the cantilever tip, since it provides information as to where to find the cantilever tip, so that finally only a small segment of the three-dimensional space must be searched in fine steps for finding the exact position of the cantilever tip.

In a further embodiment of the cantilever assembly according to the instant invention, that portion of the support to which the cantilever is attached has a recessed shape, in particular a partly-octagonal shape, the said recessed or partly-octagonal shape narrowing in the direction towards the cantilever. A thus shaped portion of the support is sufficiently stiff on one hand while at the same time—due to its "narrowed" shape—it allows that a sample may be arranged tilted within a certain range relative to the cantilever or the support, respectively, without provoking a collision between the support and the sample during approaching the sample for a scan.

In still a further embodiment of the cantilever assembly according to the instant invention, the cantilever comprises a step-like portion which is arranged near that end of the cantilever which is attached to the support. At the step-like portion the thickness of the cantilever on the front side of the cantilever (i.e. that side of the cantilever facing the sample) is substantially increased. The step-like portion enables one to very precisely define the length of the cantilever, since the length from the step towards the cantilever tip defines the length of the cantilever. The step can be manufactured with etching techniques (e.g. wet etching techniques or dry etching techniques) applied from the front side of the cantilever. This is particularly advantageous with respect to manufacture of the cantilever assemblies from so-called "silicon on oxide" wafers, as will be explained in more detail below.

In a still further embodiment of the cantilever according to the instant invention, the support comprises at least two steps, each step being provided with an edge. The edge of the first step of the support (that edge forming the "mask") is located said predetermined distance from the back side of the cantilever tip, while the edge of the second step is located such that it does not obstruct application of the high reflectance material.

The two-step embodiment is advantageous in that the first step and in particular the edge of the first step is located relatively close to the back side of the cantilever tip at the above-mentioned predetermined distance. When the high reflectance material, e.g. gold, is deposited on the back side of the cantilever through evaporation of the high reflectance material from a source, it must be ensured, that the edge of the second step does not obstruct application of the high reflectance material. Otherwise, the edge of the second step would define the boundary of the area covered by the high reflectance material, and since the edge of the second step is located too far away from the back side of the cantilever tip, a well-defined sharp boundary of the covered area as specified above may not be manufactured.

A further aspect of the instant invention deals with a process for manufacturing a cantilever assembly as described before. This process comprises applying from a source of a high reflectance material the area of the high reflectance material and the sloping boundary to the back side of the cantilever tip. The process further comprises using a sharp edge of the support of the cantilever assembly in order to limit the extensions of the area and of the boundary towards the support. While not being limited to small cantilevers, this process is particularly advantageous with regard to small cantilevers, since no separate mask is needed which must be precisely arranged. Rather, the edge functions as the "mask" and can be positioned sufficiently close to the cantilever tip in the case of small cantilevers.

In an embodiment of the process according to the instant invention, the edge of the support is located at a distance from the area on the back side of the cantilever tip. The source of the high reflectance material is also arranged at a distance from the edge of the support and has an opening having a diameter, through which the high reflectance material is applied. The distance of the edge of the support from the area on the back side of cantilever tip and the distance from the source to the edge of the support are determined such, that the condition $$\Delta c/l = d/L$$

applies, wherein $\Delta c$ denotes the extension of the boundary of the area of the high reflectance material towards the support $l$ denotes the distance of the edge of the support from the area of the high reflectance material, $d$ denotes the diameter of the opening of the source through which the high reflectance material is applied, and $L$ denotes the distance between the source and the edge of the support.

Further advantageous aspects of the cantilever assembly and of the process according to the instant invention will become apparent from the following detailed description of an embodiment of the cantilever assembly with the aid of the drawings.

DESCRIPTION OF VARIOUS AND PREFERRED EMBODIMENTS OF THE INVENTION

Figure 1:
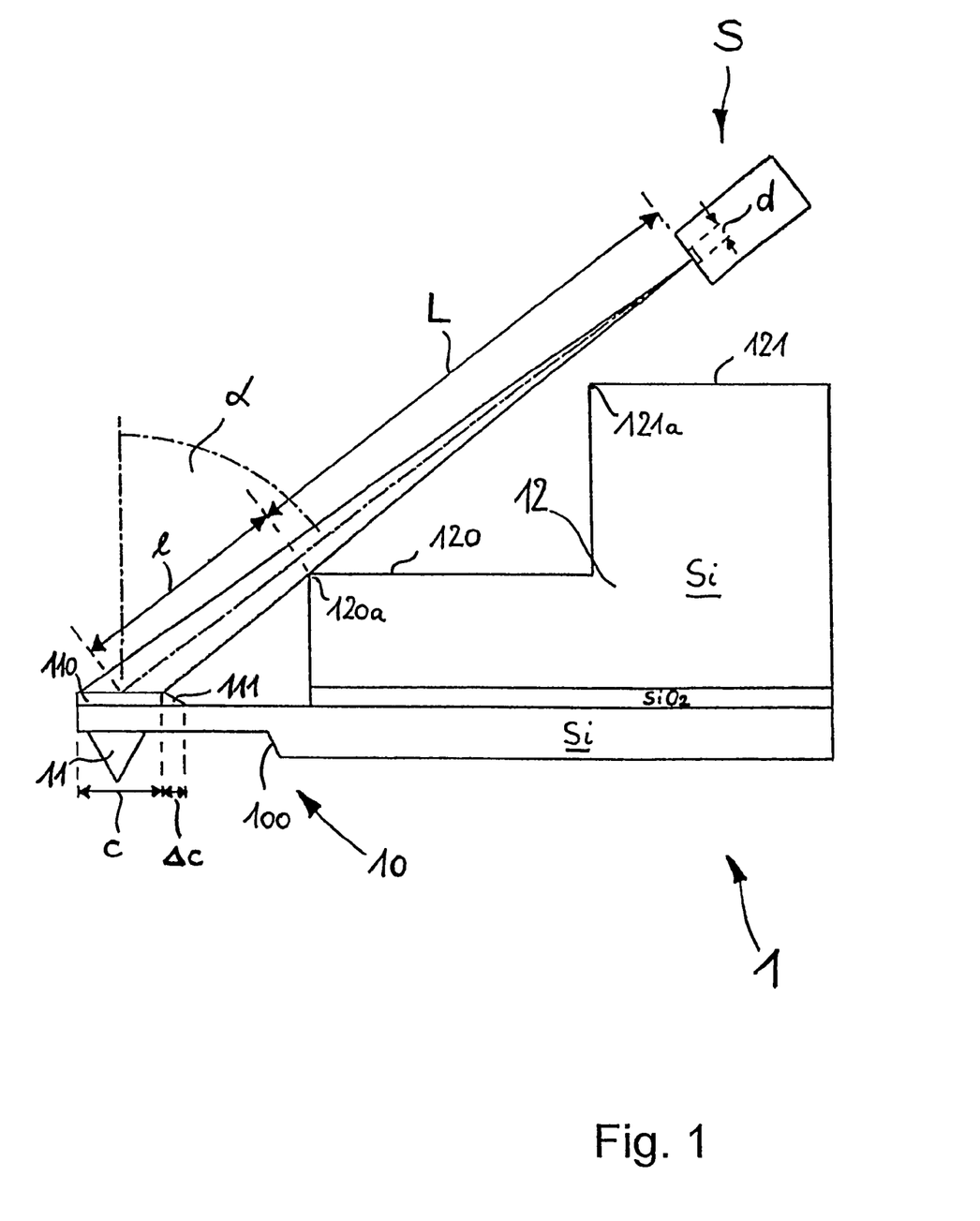
FIG. 1 shows a longitudinal section through an embodiment of the cantilever assembly according to the instant invention.

One embodiment of the cantilever assembly 1 in accordance with the instant invention, as shown in FIG. 1, comprises a cantilever 10 having a cantilever tip 11 for scanning a sample (not shown). Cantilever 10 is attached to a support 12, e.g. a chip. The embodiment shown is made from a so-called "silicon-on-oxide" wafer, that is to say, it is made from a wafer comprising three layers, a pure silicon layer followed by a silicon oxide layer which is again followed by a pure silicon layer. These layers are indicated by Si and $SiO_2$ respectively in FIG. 1.

On the backside of cantilever 10 in the region of cantilever tip 11 (this region is in the following called "the back side of cantilever tip") an area 110 consisting of a high reflectance material, e.g. gold, is provided. A high reflectance material is a material having a higher reflectance compared to pure silicon. This area 110 is sharply bounded on three sides, since cantilever 10 ends on these three sides. On the fourth side, i.e. in the direction towards support 12, area 110 has a boundary 111 that slopes towards the back side of cantilever 10.

Area 110 has an extension c in the direction towards support 12. As has already been outlined, boundary 111 should be comparatively sharp, that is to say it should not have an extension $\Delta c$ towards support 12 that is larger than extension c of area 110. This can be achieved with the aid of a specific shape of support 12, as will be explained in more detail below.

Support 12 has a stepped structure and comprises in the embodiment shown in FIG. 1 two steps 120 and 121, respectively. The first step 120 is provided with a sharp edge 120a which is located a distance l from the backside of cantilever tip 11. The second step 121 is provided with a further sharp edge 121a, which is located such that it does not obstruct application of the high reflectance material.

For the sake of better understanding how the comparatively sharp boundary 111 can be manufactured even for very small cantilevers in the range of 3 μm to 20 μm and for areas 110 in the range of 0.5 μm to 6 μm, let us assume, that the high reflectance material, e.g. gold, is to be applied to the back side of cantilever tip 11 from an evaporation source S that is arranged relative to the back side of cantilever 10 or to the back side of cantilever tip 11 under a predefined angle $\alpha$. A typical range for angle $\alpha$ is up to 15°. Also, the distance l+L from the aperture of evaporation source S to the back side of cantilever tip 11 is specified for a given evaporation source, typically this distance is within some ten centimeters.

As can be seen from FIG. 1, distance l denotes the distance from edge 120a to the back side of cantilever tip 11, while distance L denotes the distance from edge 120a to the aperture of evaporation source S. Evaporation source S has a well-defined diameter d of its aperture through which the gold is evaporated.

From the geometry of the arrangement shown in FIG. 1, the following equation can be derived:

$$\Delta c/l = d/L$$

As already outlined, the ratio of extension c of area 110 to extension $\Delta c$ of boundary 111 must be equal to or greater than one, more preferably equal to or greater than two. From the condition $$c/\Delta c \geq 1$$

follows, that for determination of the distance l of the area 110 from edge 120a the following condition applies:

$$l \leq cL/d$$

Just by way of example, if the extension c of area 110 is 4 μm, the distance L is 20 cm (it is in the range of some 10 centimeters, see above), and the diameter d of the aperture of evaporation source S is 1 cm (see also above), then a distance l results being equal to or smaller than 80 μm.

As can be seen from FIG. 1, edge 120a serves for limiting the extension $\Delta c$ of sloped boundary 111 of area 110 on the back side of cantilever tip 11 in the direction towards support 12. With regard to the other three boundaries of area 110, the back side of cantilever tip 11 is covered up to the respective edge of the back side of cantilever tip 11.

When using the so-called "silicon-on-oxide" wafers, the $SiO_2$-layer between the two pure Si-layers forms a stop for an etching process. However, in order to completely expose cantilever 10, the $SiO_2$-layer has also been removed after the etching process described above, as can be seen in FIG. 1. Since the mechanical properties of $SiO_2$ are considerably different from those of Si, cantilever 10 would not be optimally attached to support 12, since two materials having different mechanical properties (e.g. thermal expansion coefficients) are abutting against each other at the attachment location. This would result in a reduced quality factor and accordingly in a reduced sensitivity of cantilever 10, if no additional measures were taken.

In order to maintain the high quality factor of cantilever 10, cantilever 10 is provided with a step-like portion 100 which is arranged near that end of cantilever 10 which is attached to support 12. Step-like portion 100 is arranged a small distance away from the attachment location. At step-like portion 100, the thickness of cantilever 10 substantially increases on the front side of cantilever 10—i.e. on that side of cantilever 10 facing downwards in FIG. 1. By providing step-like portion 100 the length of cantilever 10 is well-defined, since after having increased its thickness, that portion with the substantially increased thickness already functions as a support. Accordingly, the flexible part of cantilever 10 has a well-defined length, and in addition the attachment of the flexible part of cantilever 10 to the massive "support" is executed in the same material (silicon), thus avoiding a decrease of the quality factor.

Figure 2:
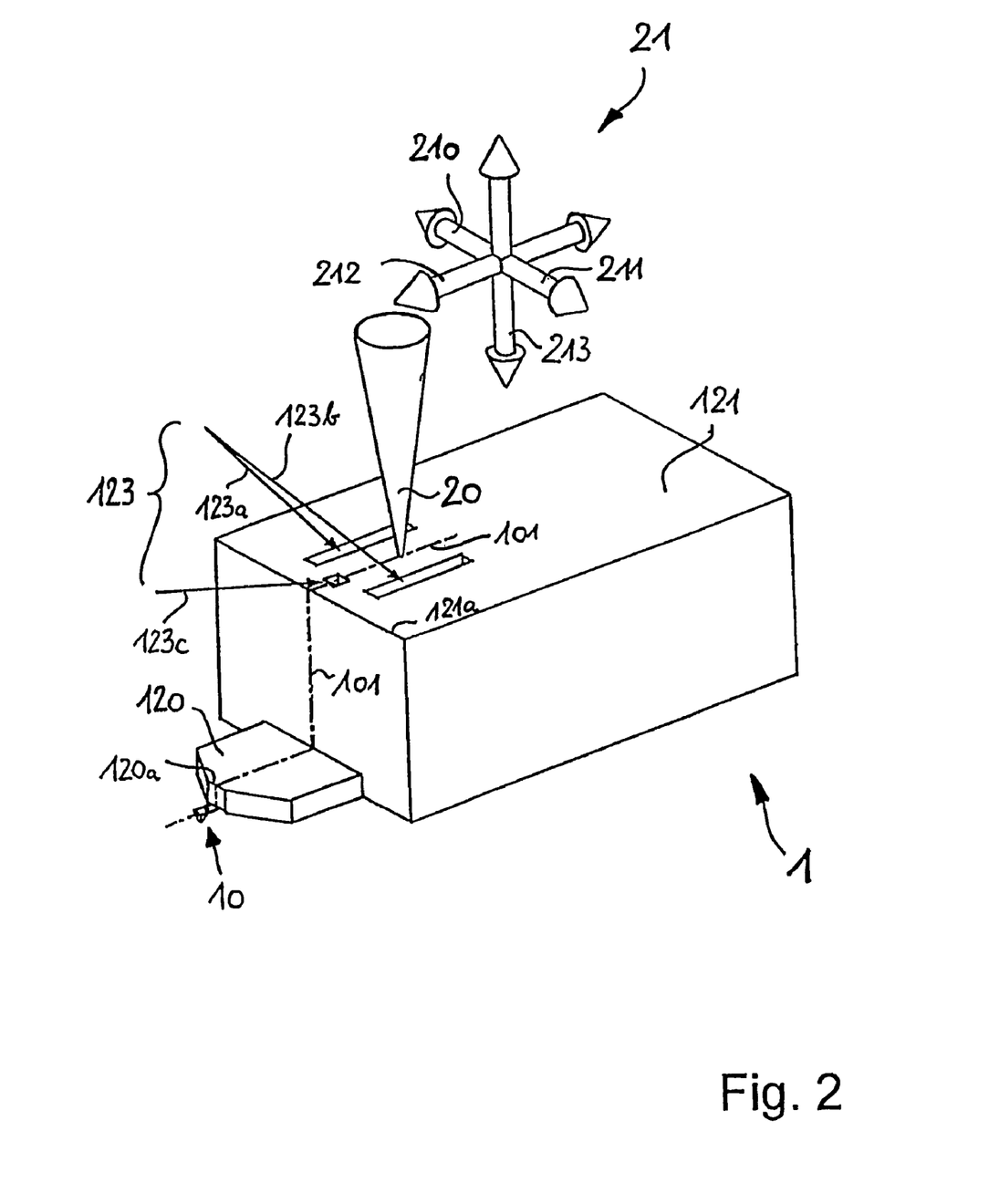
FIG. 2 shows a perspective view of the embodiment of the cantilever assembly of FIG. 1.

Referring now to FIG. 2, cantilever assembly 1 is shown in a perspective view, so that a more detailed impression of the shapes of the two steps 120 and 121 can be obtained. In particular the shape of step 120 will be explained in further detail below with respect to FIG. 4. FIG. 2 further shows an embodiment of a guidance and calibration structure 123 comprising—by way of example—two grooves 123a and 123b extending symmetrically and parallel to continued longitudinal axis 101 of cantilever 10. In addition, guidance and calibration structure 123 comprises a recess 123c or pit having a well-defined length and depth, which is arranged on the continued longitudinal axis 101 of cantilever 10. Guidance and calibration structure 123 is intended to help in guiding and calibrating the optical tracking system (e.g. during positioning of the deflection sensor), since firstly the optical tracking system must "find" the cantilever tip.

Grooves 123a and 123b as well as recess 123c and their edges are very precisely manufactured at very precise locations. Accordingly, in a first step optical tracking system focuses on the upper surface of step 121 in order to start a guiding and calibration run. The following explanation offers one out of a number of possibilities how such a guiding and calibration run of the optical system may look like.

After having focused on the upper surface of step 121, the displacement units of the optical tracking system—which are schematically represented by three-dimensional arrow arrangement 21 in FIG. 2—move the optical tracking system, which is schematically represented through beam 20 in FIG. 2, in a direction perpendicular to continued longitudinal axis 101 until beam 20 reaches the edge of a groove. For example, the displacement units of the optical tracking system firstly move optical tracking system in the direction of arrow 210 until it reaches the inner edge of groove 123a. The inner edge of groove 123a is sensed—for example—by a change in intensity of the reflected light. The displacement units then move optical tracking system in the direction of arrow 211 until it reaches the inner edge of groove 123b. Once it has detected the inner edge of groove 123b, optical tracking system knows, that continued longitudinal axis 101 must be located half-way between the two detected edges because of the symmetrical arrangement of grooves 123a and 123b with respect to continued longitudinal axis 101. Also, since optical tracking system has counted the number of steps a stepper motor driving the displacement units has needed to move optical system between the inner edges of grooves 123a and 123b, and because the distance between the inner edges of grooves 123a and 123b is precisely known, optical tracking system exactly knows the distance to which one step of the stepper motor corresponds in the direction of arrows 210 or 211.

The displacement units now move optical tracking system (i.e. beam 20) back to continued longitudinal axis 101 and subsequently continues to move optical tracking system in a direction perpendicularly to arrows 210 or 211, i.e. in the direction of arrow 212 until beam 20 reaches the inner edge of recess 123c. The displacement units continue to move optical tracking system across recess 123c in the direction of continued longitudinal axis 101 until beam 20 reaches the outer edge of recess 123c. Again, optical tracking system counts the number of steps needed to move beam 20 from the inner edge of recess 123c to the outer edge of recess 123c. Since the distance between inner and outer edge of recess 123c is precisely known, the optical tracking system now knows the distance to which one step of the stepper motor corresponds in the direction of arrow 212. Optical tracking system is now calibrated in the plane of upper surface of step 120b and can be guided on continued longitudinal axis 101.

Recess 123c can also be used for calibration of the optical tracking system with respect to depth, since recess 123c has a precisely defined depth, as outlined above. Accordingly, the displacement units can move optical tracking system back over recess 123c so that beam 20 is out of focus. Subsequently, the displacement units move optical tracking system in the direction of arrow 213 until beam 20 is focused on the bottom surface of recess 123c, which can be detected—for example—by detecting the maximum intensity of the reflected light. Again, the optical tracking system counts the number of steps of the stepper motor required between the position in which beam 20 is focused on the upper surface of step 121 and the position in which beam 20 is focused on the bottom surface of recess 123c. Since the depth of recess 123c is precisely known, optical tracking system now knows the distance to which one step of the stepper motor corresponds in the direction of arrow 213.

Optical tracking system is now moved back to focus on the upper surface of step 121, and can now be moved along longitudinal axis until beam 20 passes edge 121a of step 121. Having passed edge 121a, optical tracking system is moved downwardly towards step 120, until beam 20 is focused to the upper surface of step 120. Then optical tracking system can be moved along continued longitudinal axis 101 until beam 20 passes edge 120a of step 120. Having passed edge 120a of step 120, optical tracking system is moved downwardly towards the back side of cantilever 10, until it is focused on the back side of cantilever 10. Movement of optical tracking system is then continued until beam 20 impinges on area 110, which can be identified by the increasing intensity of the reflected light.

In order to substantially accelerate guiding and focusing the optical tracking system to the back side of cantilever tip 11 after calibration, the distance between inner and/or outer edge of recess 123c and edge 121a of step 121 is known, as well as the distance between upper surface of step 121 and upper surface of step 120. Finally, the length of step 120 is also known, as well as the distance between the upper surface of step 120 and the back side of cantilever 10. Finally, the length of cantilever 10 is known, so that optical tracking system can be quickly guided and focused to a target point in the three-dimensional space, which is located at least in relatively close vicinity of area 110. The final exact positioning and focusing on area 110 can then be performed in a comparatively short time, since optical tracking system must only "search" in a very small section of the three-dimensional space, since it can be quickly guided to a point in the three-dimensional space, which is located at least in close vicinity of area 110. As outlined above, the calibration structure shown in FIG. 2 has only been described by way of example and other suitable calibration structures can be used as well.

Figure 3:
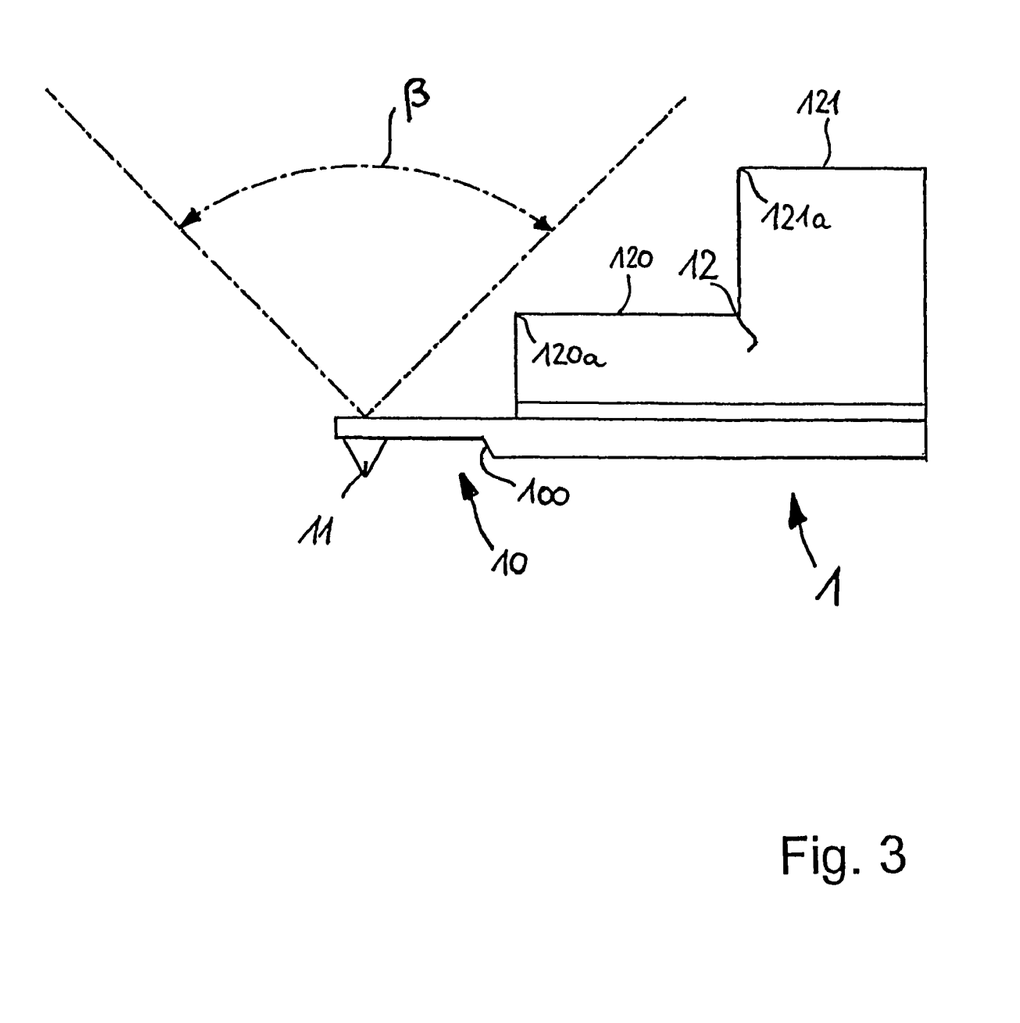
FIG. 3 shows essentially the longitudinal section through the embodiment of the cantilever assembly of FIG. 1 together with a schematic representation of an aperture angle of the optical tracking system.

Turning now to FIG. 3, which shows essentially a longitudinal section through the embodiment of the cantilever assembly shown in FIG. 1, but in addition represents the angular aperture β of an optical tracking system having a high numerical aperture. The shape of cantilever assembly 1 is not in contrast with a high numerical aperture of the optical tracking system. This is advantageous with respect to obtaining a small focus spot (typically <5 μm) on area 110 on the back side of cantilever tip 11. The higher the numerical aperture that can be used the more precise the focusing and the higher the quality of the image from the sample. An aperture β of greater than 30° is particularly advantageous.

Figure 4:
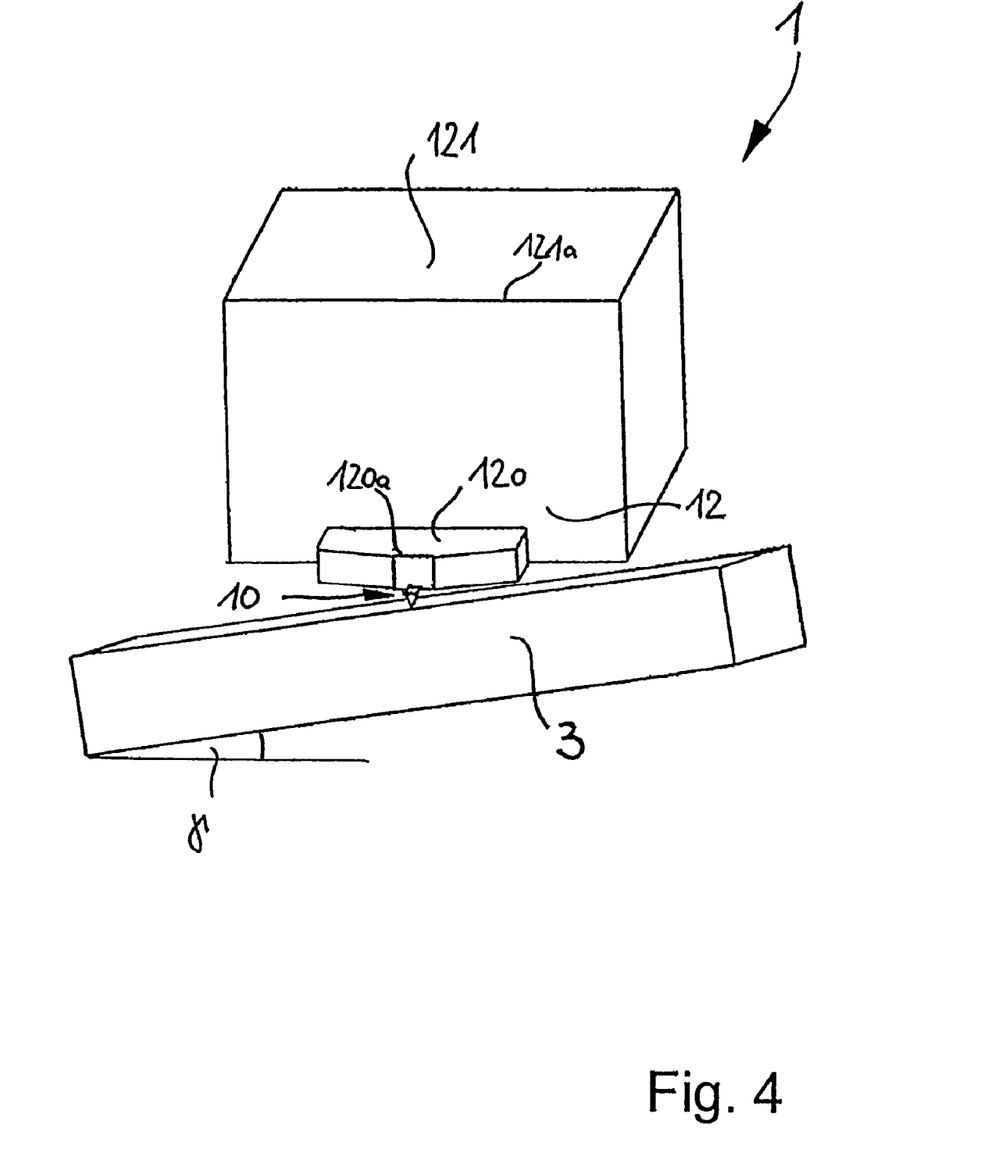
FIG. 4 shows a front perspective view of the embodiment of the cantilever assembly of FIG. 1, with a sample tilted relative to the cantilever, and, FIG. 5 shows a longitudinal section through a further embodiment of the cantilever assembly according to the instant invention.
Figure 5:
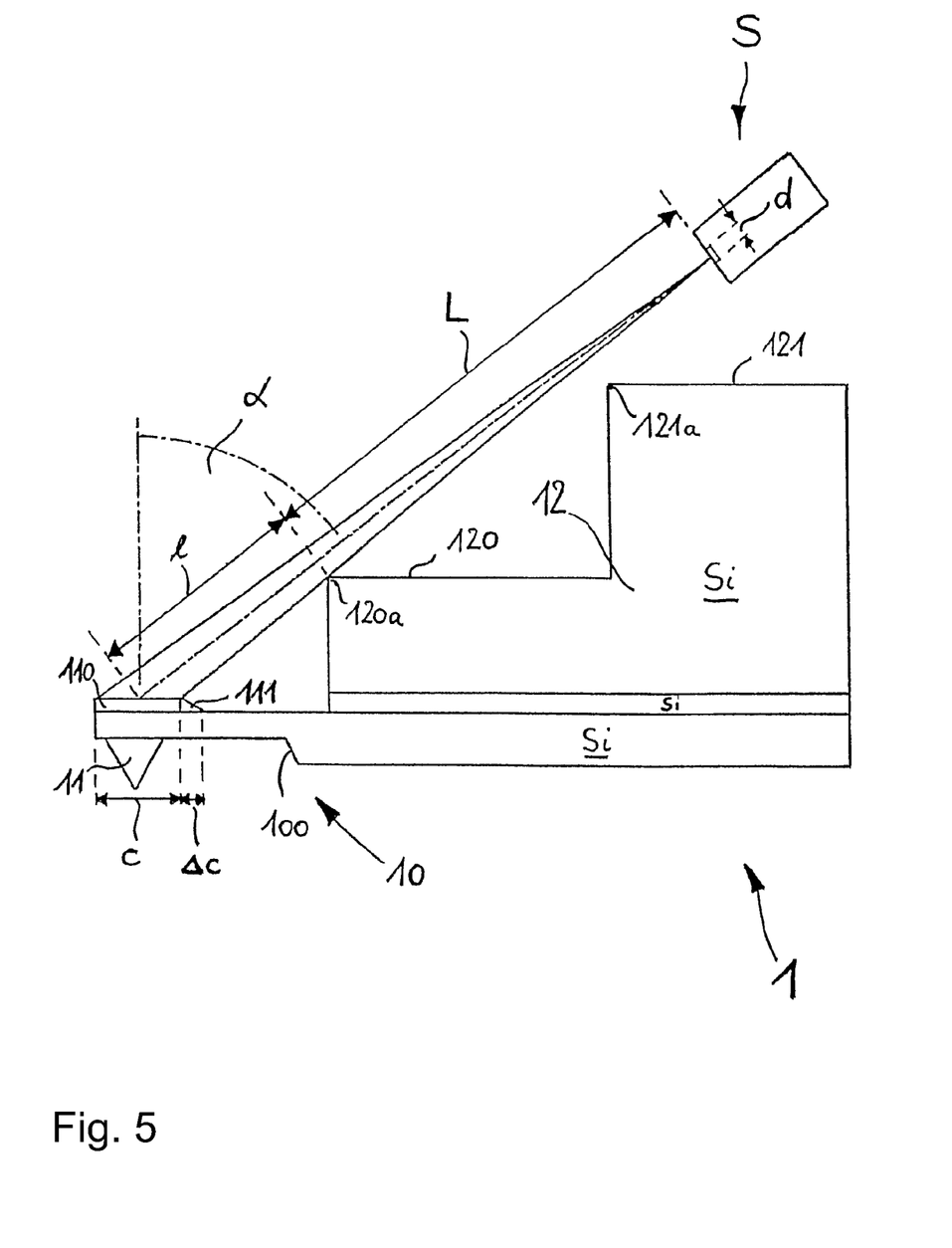

FIG. 4 shows a front perspective view of cantilever assembly 1, together with a sample 3 that is slightly tilted by an angle .gamma. relative to cantilever 10 and support 12. From FIG. 4 another problem usually encountered in the scanning of samples becomes apparent. This problem is related to the tilted arrangement of sample 3 relative to cantilever 10 and support 12, and will now be explained. Cantilever assembly 1 may approach sample 3 from behind as is shown in FIG. 4. Cantilever 10 is attached to support 12 comprising steps 120 and 121. In order now to avoid a collision between support 12 and sample 3 (or more precisely between step 120 of the support and sample 3) during approaching sample 3, step 120 of support 12 (which is that portion of support 12 to which the cantilever is attached) has a recessed shape, in the shown embodiment a partly-octagonal shape. The said partly-octagonal shape narrows in the direction towards cantilever 10.

The recessed partly-octagonal shape of step 120 is advantageous in that it is on one hand sufficiently stiff (since step 120 has sufficient mass) in order to form a rigid support for cantilever 10. On the other hand, the recessed step 120 allows for a certain tilt of sample 3 relative to support 12 or step 120, respectively, so that during approaching the sample 3 a collision between sample 3 and support 12 or step 120, respectively, is unlikely to occur.

What is claimed is:

1. Cantilever assembly for scanning a sample, comprising a cantilever having a length of 1 μm to 100 μm and having a cantilever tip, the cantilever having a front side facing the sample and a backside facing away from that sample, said cantilever being mounted to a rigid support and being provided on said back side facing away from the sample with an area of a high reflectance material, this area having a boundary sloping towards said support, wherein extensions (c, Δc) of the area and the boundary towards said support fulfill the condition $c/\Delta c \geq 1$, wherein
- c denotes an extension of the area of the high reflectance material in a direction towards the support, and
- $\Delta c$ denotes an extension of the sloped boundary of the area of the high reflectance material in a direction towards the support.

2. Cantilever assembly according to claim 1, wherein the extension (c) of the area of the high reflectance material towards the support is in the range of 0.5 µm to 10 µm.

3. Cantilever assembly according to claim 2, wherein the length of the cantilever is in the range of 3 µm to 20 µm.

4. Cantilever assembly according to claim 2, wherein the extension (c) of the area of the high reflectance material towards the support is in the range of 1 µm to 6 µm.

5. Cantilever assembly according to claim 2, wherein the support is provided with a sharp edge that is located a distance (l) from a back side of the cantilever tip, the distance (l) being determined such that during application of the high reflectance material the area on the back side of the cantilever tip and the sloping boundary are formed.

6. Cantilever assembly according to claim 1, wherein the support is provided with a sharp edge that is located a distance (l) from a back side of the cantilever tip, the distance (l) being determined such that during application of the high reflectance material the area on the back side of the cantilever tip and the sloping boundary are formed.

7. Cantilever assembly according to claim 1, wherein that portion of the support to which the cantilever is attached has a recessed shape, said recessed shape narrowing in a direction towards the cantilever.

8. Cantilever assembly according to claim 7, wherein the recessed shape is irregularly hexagonal.

9. Cantilever assembly according to claim 1, wherein the cantilever comprises a step-like portion which is arranged near that end of the cantilever which is attached to the support, said step-like portion substantially increasing a thickness of the cantilever on a front side of the cantilever.

10. Cantilever assembly according to claim 1, wherein said support comprises at least two steps, the steps being provided with an edge, wherein the edge of the first step is located such that during application of the high reflectance material the area on the back side of the cantilever tip and the sloping boundary are formed and wherein the edge of the second step is located such that it does not obstruct application of the high reflectance material.

11. Cantilever assembly for scanning a sample, comprising a cantilever having a length of 1 µm to 100 µm and having a cantilever tip, the cantilever being mounted to a rigid support and being provided on its back side facing away from the sample with an area of a high reflectance material, this area having a boundary sloping towards said support, wherein extensions (c, $\Delta c$) of the area and the boundary towards said support fulfill the condition $c/\Delta c \geq 1$, wherein
- c denotes an extension of the area of the high reflectance material in a direction towards the support, and
- $\Delta c$ denotes an extension of the sloped boundary of the area of the high reflectance material in a direction towards the support,
- wherein the support further comprises a guidance and calibration structure for guiding and calibrating an optical tracking system in focusing on the area of the high reflectance material.

12. Process for manufacturing a cantilever assembly for scanning a sample, said process comprising
- providing a cantilever having a front side facing the sample and a backside facing away from that sample and having a cantilever tip and having a length of 1 µm to 100 µm and being mounted on a rigid support
- applying onto said back side of the cantilever facing away from the sample, from a source (S), a high reflectance material to form an area of high reflectance material, wherein the area has a sloping boundary towards said support, wherein extensions (c, $\Delta c$) of the area and the boundary towards said support fulfill the condition $c/\Delta c \geq 1$, wherein
- c denotes an extension of the area of the high reflectance material in a direction towards the support, and
- $\Delta c$ denotes an extension of the sloped boundary of the area of the high reflectance material in a direction towards the support, wherein a sharp edge of the support of the cantilever assembly is used in order to limit the extensions (c, $\Delta c$) of the area and of the boundary towards the support.

13. Process for manufacturing a cantilever assembly for scanning a sample, said process comprising
- providing a cantilever having a cantilever tip and having a length of 1 µm to 100 µm and being mounted on a rigid support
- applying onto a back side of the cantilever facing away from the sample, from a source (S), a high reflectance material to form an area of high reflectance material,
- wherein the area has a sloping boundary towards said support, wherein extensions (c, $\Delta c$) of the area and the boundary towards said support fulfill the condition $c/\Delta c \geq 1$, wherein
- c denotes an extension of the area of the high reflectance material in a direction towards the support, and
- $\Delta c$ denotes an extension of the sloped boundary of the area of the high reflectance material in a direction towards the support, wherein a sharp edge of the support of the cantilever assembly is used in order to limit the extensions (c, $\Delta c$) of the area and of the boundary towards the support, wherein the edge of the support is located at a distance from the area on the back side of the cantilever tip and wherein the source (S) of the high reflectance material is arranged at a distance (L) from the edge of the support and has an opening having a diameter (d), through which the high reflectance material is applied, and wherein the distance (l) from the area on the back side of cantilever tip and the edge of the support and a distance (L) from the source to the edge of the support are determined such, that $\Delta c/l = d/L$ wherein
- $\Delta c$ denotes as above,
- l denotes a distance of the edge of the support from the area of the high reflectance material,
- d denotes a diameter of an opening of the source (S) through which the high reflectance material is applied, and
- L denotes a distance between the source (S) and the edge of the support.

14. Cantilever assembly for scanning a sample, comprising a cantilever having a cantilever tip, the cantilever being mounted to a rigid support, wherein a portion of the support has a stepwise recessed flank profile with a width narrowing in a direction towards the cantilever, wherein the cantilever is mounted to the rigid support via an attachment, wherein the attachment is executed via a material which is the same as the cantilever and the rigid support.

15. Cantilever assembly according to claim 14, wherein the width narrowing in the direction towards the cantilever takes form of an irregular hexagon.

16. Cantilever assembly according to claim 14, wherein a back side of the cantilever facing away from the sample comprises an area of a high reflectance material, which area has a boundary sloping towards the support.

17. Cantilever assembly for scanning a sample, comprising a cantilever having a cantilever tip, the cantilever having a back side and a front side opposite said back side and the cantilever being mounted to a rigid support on the back side, wherein the cantilever comprises a step-like portion on its front side near where the cantilever is attached to the support, the step-like portion substantially increasing a thickness of the cantilever, wherein the cantilever is attached to the rigid support via an attachment, wherein the attachment is executed via a material which is the same as the cantilever and the rigid support.

18. Cantilever assembly according to claim 17, wherein a back side of the cantilever facing away from the sample comprises an area of a high reflectance material, which area has a boundary sloping towards the support.

19. Cantilever assembly according to claim 17, wherein the cantilever abuts against the support via an attachment location at the back side of the cantilever.

* * * * *

UNITED STATES PATENT AND TRADEMARK OFFICE
CERTIFICATE OF CORRECTION

| | | |
|---|---|---|
| PATENT NO. | : 8,109,135 B2 | Page 1 of 2 |
| APPLICATION NO. | : 10/595690 | |
| DATED | : February 7, 2012 | |
| INVENTOR(S) | : Hug et al. | |

It is certified that error appears in the above-identified patent and that said Letters Patent is hereby corrected as shown below:

The address of the assignee was incorrectly listed by the undersigned in the PTOL-85B form. The correct address is Neuchatel, Switzerland as indicated on the assignment recorded at reel/frame no. 019526/0525.

In the issued specification:

On column 7, please correct the paragraph starting on line 20 as follows:

-- The displacement units now move optical tracking system (i.e. beam 20) back to continued longitudinal axis 101 and subsequently continues to move optical tracking system in a direction perpendicularly to arrows 210 or 211, i.e. in the direction of arrow 212 until beam 20 reaches the inner edge of recess 123c. The displacement units continue to move optical tracking system across recess 123c in the direction of continued longitudinal axis 101 until beam 20 reaches the outer edge of recess 123c. Again, optical tracking system counts the number of steps needed to move beam 20 from the inner edge of recess 123c to the outer edge of recess 123c. Since the distance between inner and outer ~~edge~~ edges of recess 123c is precisely known, the optical tracking system now knows the distance to which one step of the stepper motor corresponds in the direction of arrow 212. Optical tracking system is now calibrated in the plane of upper surface of step 120b and can be guided on continued longitudinal axis 101. --

On column 8, please correct the paragraph starting on line 1 as follows:

-- In order to substantially accelerate guiding and focusing the optical tracking system to the back side of cantilever tip 11 after calibration, the distance between inner and/or outer ~~edge~~ edges of recess 123c and edge 121a of step 121 is known, as well as the distance between upper surface of step 121 and upper surface of step 120. Finally, the length of step 120 is also known, as well as the distance between the upper surface of step 120 and the back side of cantilever 10. Finally, the length of cantilever 10 is known, so that optical tracking system can be quickly guided and focused to a target point in the three-dimensional space, which is located at least in relatively close vicinity of area 110.

Signed and Sealed this
Twenty-third Day of October, 2012

David J. Kappos
*Director of the United States Patent and Trademark Office*

CERTIFICATE OF CORRECTION (continued)
U.S. Pat. No. 8,109,135 B2

The final exact positioning and focusing on area 110 can then be performed in a comparatively short time, since optical tracking system must only "search" in a very small section of the three-dimensional space, since it can be quickly guided to a point in the three-dimensional space, which is located at least in close vicinity of area 110. As outlined above, the calibration structure shown in FIG. 2 has only been described by way of example and other suitable calibration structures can be used as well. --

On column 8, please correct the paragraph starting on line 33 as follows:

-- FIG. 4 shows a front perspective view of cantilever assembly 1, together with a sample 3 that is slightly tilted by an angle .gamma. relative to cantilever 10 and support 12. From FIG. 4 another problem usually encountered in the scanning of samples becomes apparent. This problem is related to the tilted arrangement of sample 3 relative to cantilever 10 and support 12, and will now be explained. Cantilever assembly 1 may approach sample 3 from behind as is shown in FIG. 4. Cantilever 10 is attached to support 12 comprising steps 120 and 121. In order now to avoid a collision between support 12 and sample 3 (or more precisely between step 120 of the support and sample 3) during approaching sample 3, step 120 of support 12 (which is that portion of support 12 to which the cantilever is attached) has a recessed shape, in the shown embodiment a partly-octagonal shape. The ~~said~~ partly-octagonal shape narrows in the direction towards cantilever 10. --